United States Patent
Tajima (10) Patent No.: US 10,419,735 B2
(45) Date of Patent: Sep. 17, 2019

(54) IMAGE PROCESSING APPARATUS FOR TONE CONVERSION, IMAGE PROCESSING METHOD FOR TONE CONVERSION, AND STORAGE MEDIUM

(71) Applicant: CANON KABUSHIKI KAISHA, Tokyo (JP)

(72) Inventor: Kaori Tajima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/010,804

(22) Filed: Jun. 18, 2018

(65) Prior Publication Data

US 2018/0367781 A1    Dec. 20, 2018

(30) Foreign Application Priority Data

Jun. 19, 2017   (JP) ................. 2017-119883

(51) Int. Cl.
*H04N 11/20*     (2006.01)
*H04N 9/64*      (2006.01)
*H04N 9/77*      (2006.01)
*H04N 9/68*      (2006.01)

(52) U.S. Cl.
CPC ............... *H04N 11/20* (2013.01); *H04N 9/64* (2013.01); *H04N 9/68* (2013.01); *H04N 9/77* (2013.01)

(58) Field of Classification Search
CPC ................................................... H04N 11/20

USPC ........................................................ 348/254
See application file for complete search history.

(56) References Cited

U.S. PATENT DOCUMENTS

| 8,280,162 B2* | 10/2012 | Tsukioka | G06T 5/009 |
| | | | 382/167 |
| 2014/0036105 A1* | 2/2014 | Iwaki | H04N 9/67 |
| | | | 348/223.1 |

FOREIGN PATENT DOCUMENTS

JP           3919389 B2    5/2007

* cited by examiner

*Primary Examiner* — Joel W Fosselman
(74) *Attorney, Agent, or Firm* — Carter, DeLuca & Farrell LLP (57) ABSTRACT

The image processing apparatus includes a first generation unit that generates a color signal component for a luminance signal, a second generation unit that generates a color signal component for a chrominance signal, a first tone conversion unit that performs a first tone conversion, a second tone conversion unit that performs a second tone conversion, a third generation unit that generates a color signal component used in common, and a third tone conversion unit that performs a third tone conversion on a signal after being processed by the third generation unit. The first and second tone conversion units perform tone conversion using a conversion amount smaller than a conversion amount that matches the target curve, and the third tone conversion unit performs tone conversion using a conversion amount corresponding to a difference from the target curve.

18 Claims, 7 Drawing Sheets

IMAGE PROCESSING APPARATUS FOR TONE CONVERSION, IMAGE PROCESSING METHOD FOR TONE CONVERSION, AND STORAGE MEDIUM

BACKGROUND OF THE INVENTION

Field of the Invention

The present invention relates to a technique for converting the tone characteristics of captured image signals into tone characteristics suitable for outputting the image signals to an HDR monitor.

Description of the Related Art

In recent years, as the display luminance of displays are increasing, HDR (high dynamic range) camera systems that can reproduce a tone on a high-luminance side that is closer to that of an actual view have been proposed, the tone on a high-luminance side having been compressed so far. In addition, standards for a color space and tone compression of video signals that are handled by an HDR monitor, such as ST2084 and BT.2100, are being prescribed.

In the case of generating, in a camera, video signals adapted for an HDR standard, tone conversion is performed on an input image obtained via an optical system and an image sensor, so as to be adapted for the HDR standard, luminance signals and chrominance signals are then separated, and video signals are output. In an HDR monitor, upon receiving the video signals that have been output from the camera, conversion is performed into a color space for display processing such as RGB or XYZ, tone conversion on the monitor side that is adapted for the HDR standard is applied, and display is performed.

Conventionally, image processing that optimizes both output of colors and output of luminance in consideration of the human visual sense characteristics has been suggested as processing on the camera side (Japanese Patent No. 3919389).

In an image processing apparatus disclosed in Japanese Patent No. 3919389, signal processing for chrominance output (color-related signal processing) and signal processing for luminance output (luminance-related signal processing) are optimized. Therefore, there are cases where a difference in amplitude level between luminance components that are separated from an input image in color-related signal processing and luminance components that are generated from the input image in luminance-related signal processing occurs. In particular, in tone conversion characteristics adapted for an HDR standard such as ST2084, rise in a dark portion is steep, and thus there are cases where a difference in amplitude level of luminance components is emphasized by performing tone conversion. As a result, when converting video signals that are output from a camera into a color space for display on an HDR monitor, there is an issue that false signals are generated in the color space for display due to the difference in luminance amplitude level that occurred in the camera, and the image quality is deteriorated significantly.

SUMMARY OF THE INVENTION

The present invention has been made in light of the above-described issue, and provides an image processing apparatus that can suppress an increase in amplitude level difference of luminance components when performing tone conversion processing optimized for both luminance and colors.

According to a first aspect of the present invention, there is provided an image processing apparatus that performs tone conversion on an input image signal such that a curve indicating a relationship between a signal level of an input image signal and a signal level of an output image signal matches a target curve aimed to be achieved, the image processing apparatus comprising: a first generation unit configured to generate a color signal component for a luminance signal from an input image signal; a second generation unit configured to generate a color signal component for a chrominance signal from an input image signal; a first tone conversion unit configured to perform a first tone conversion on the color signal component for a luminance signal; a second tone conversion unit configured to perform a second tone conversion on the color signal component for a chrominance signal; a third generation unit configured to generate a color signal component used in common for a luminance signal and a chrominance signal by combining an output of the first tone conversion unit and an output of the second tone conversion unit; and a third tone conversion unit configured to perform a third tone conversion on a signal after being processed by the third generation unit, wherein the first and second tone conversion units perform tone conversion using a conversion amount smaller than a conversion amount that is set such that a curve indicating the relationship between the signal level of an input image signal and the signal level of an output image signal matches the target curve, and the third tone conversion unit performs tone conversion using a conversion amount corresponding to a difference from the target curve that remained after the first and second tone conversion units performed tone conversion.

According to a second aspect of the present invention, there is provided an image processing apparatus that performs tone conversion on an input image signal, comprising: a first generation unit configured to generate a color signal component for a luminance signal from an input image signal; a second generation unit configured to generate a color signal component for a chrominance signal from an input image signal; a first tone conversion unit configured to perform a first tone conversion on the color signal component for a luminance signal; a second tone conversion unit configured to perform a second tone conversion on the color signal component for a chrominance signal; a third generation unit configured to generate a color signal component used in common for a luminance signal and a chrominance signal by combining an output of the first tone conversion unit and an output of the second tone conversion unit; and a third tone conversion unit configured to perform a third tone conversion on a signal after being processed by the third generation unit, wherein the first and second tone conversion units perform tone conversion of a relatively low non-linearity, and the third tone conversion unit performs tone conversion of a relatively high non-linearity compared to the first and second tone conversion units.

According to a third aspect of the present invention, there is provided an image processing method for performing tone conversion on an input image signal such that a curve indicating a relationship between a signal level of an input image signal and a signal level of an output image signal matches a target curve aimed to be achieved, the method comprising: executing a first generation for generating a color signal component for a luminance signal from an input image signal; executing a second generation for generating a color signal component for a chrominance signal from an input image signal; performing a first tone conversion on the color signal component for a luminance signal; performing a second tone conversion on the color signal component for a chrominance signal; executing a third generation for generating a color signal component used in common for a luminance signal and a chrominance signal by combining an output of the first tone conversion and an output of the second tone conversion; and performing a third tone conversion on a signal after being processed in the third generation, wherein, in the first and second tone conversions, tone conversion is performed using a conversion amount smaller than a conversion amount that is set such that a curve indicating the relationship between the signal level of an input image signal and the signal level of an output image signal matches the target curve, and in the third tone conversion, tone conversion is performed using a conversion amount corresponding to a difference from the target curve that remained after the first and second tone conversions were performed.

According to a fourth aspect of the present invention, there is provided an image processing method for performing tone conversion on an input image signal, the method comprising: executing a first generation for generating a color signal component for a luminance signal from an input image signal; executing a second generation for generating a color signal component for a chrominance signal from an input image signal; performing a first tone conversion on the color signal component for a luminance signal; performing a second tone conversion on the color signal component for a chrominance signal; executing a third generation for generating a color signal component used in common for a luminance signal and a chrominance signal by combining an output of the first tone conversion and an output of the second tone conversion; and performing a third tone conversion on a signal after being processed in the third generation, wherein, in the first and second tone conversion, tone conversion of a relatively low non-linearity is performed, and in the third tone conversion, tone conversion of a relatively high non-linearity compared to those in the first and second tone conversion is performed.

Further features of the present invention will become apparent from the following description of exemplary embodiments with reference to the attached drawings.

DESCRIPTION OF THE EMBODIMENTS

Embodiments of the present invention will be described below in detail with reference to the attached drawings.

First Embodiment

Figure 1:
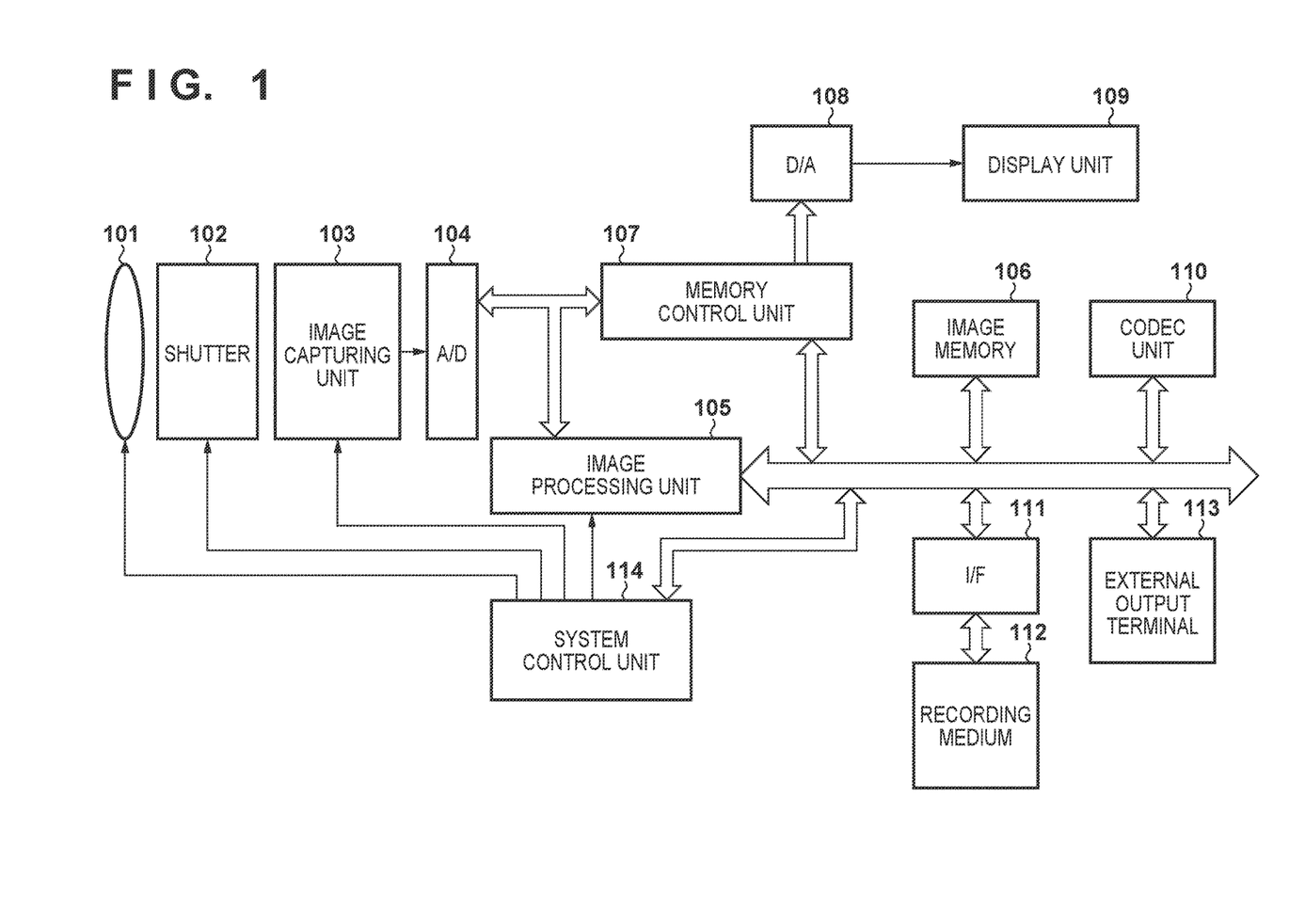
FIG. 1 is a block diagram showing the configuration of a digital camera that is a first embodiment of an image processing apparatus of the present invention.

FIG. 1 is a block diagram showing an exemplary configuration of a digital camera that is a first embodiment of an image processing apparatus of the present invention.

In FIG. 1, a lens group 101 includes a zoom lens and a focus lens, and forms a subject image. A shutter 102 has a function for opening/closing a light path and a diaphragm function. An image capturing unit 103 is constituted by a CMOS image sensor or the like, and converts an optical image into electrical signals. An A/D converter 104 converts analog image signals that are output from the image capturing unit 103 into digital image signals. An image processing unit 105 performs, on image data that has been output from the A/D converter 104, various types of image processing such as white balance processing, demosaic processing, noise reduction processing, contour emphasis processing, tone conversion processing, and color correction processing. An image memory 106 temporarily stores image data. A memory control unit 107 controls input/output of image data to/from the image memory 106. A D/A converter 108 converts digital signals that have been input, into analog signals. A display unit 109 is constituted by an LCD or the like, and displays image data that has been output from the D/A converter 108, and the like. A codec unit 110 performs compression encoding/decoding on image data.

A recording medium 112 is constituted by a memory card, a hard disk, or the like, and stores image data. An interface 111 is an interface for outputting video signals to the recording medium 112. An external output terminal 113 outputs video signals generated by the digital camera of this embodiment to an external device connect to this digital camera, such as an HDR (high dynamic range) monitor or the like. A system control unit 114 controls the entire system of the digital camera.

Next, basic operations in a digital camera configured as described above will be described. The image capturing unit 103 photoelectrically converts light that is incident via the lens 101 and the shutter 102, and outputs generated image signals as input image signals to the A/D converter 104. The A/D converter 104 converts the analog image signals that are output from the image capturing unit 103 into digital image signals, and outputs the digital image signals to the image processing unit 105.

The image processing unit 105 processes image data that has been output from the A/D converter 104, or image data that has been output from the memory control unit 107, and generates video signals to be output to the codec unit 110 and the external output terminal 113. Image data that has been output from the image processing unit 105 is written to the image memory 106 via the memory control unit 107. The image memory 106 stores image data that has been output from the A/D converter 104 and image data to be displayed on the display unit 109.

In addition, the D/A converter 108 converts, into analog signals, image data that is stored in the image memory 106, and is to be displayed, and supplies the analog signals to the display unit 109. The display unit 109 performs display that is based on the analog signals that have been output from the D/A converter 108, on a display device such as an LCD. The codec unit 110 performs compression coding on image data stored in the image memory 106. The system control unit 114 stores encoded image data to a recording medium via the interface 111. The system control unit 114 also outputs video signals that are output from the image memory 106, the image processing unit 105, or the codec unit 110, to an external output device such as an HDR monitor via the external output terminal 113.

Figure 2:
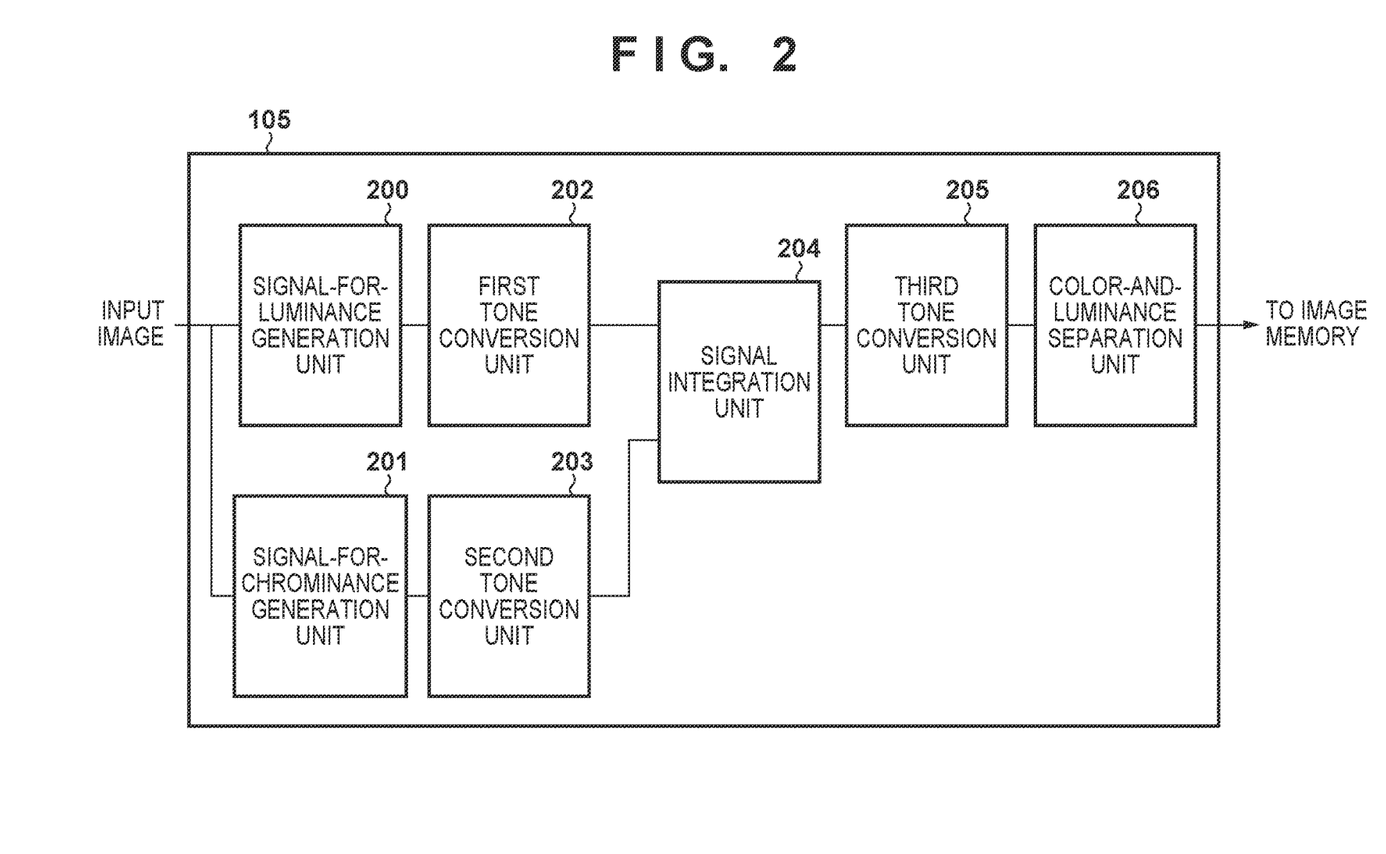
FIG. 2 is a block diagram showing the configuration of the image processing unit in the first embodiment.

Next, FIG. 2 is a diagram showing the configuration of the image processing unit 105. In FIG. 2, a signal-for-luminance generation unit 200 generates, from an input image, RGB signal components (color signal component) suitable for luminance signals. A signal-for-chrominance generation unit 201 generates, RGB signal components (color signal components) suitable for chrominance signals, from an input image. Here, a human visual sense system has a characteristic of responding to a change in brightness to a higher spatial frequency than for color. Therefore, the signal-for-luminance generation unit 200 performs demosaic processing, noise reduction processing, contour compensation processing, and the like on image data that has been output from the A/D converter 104, so as to include many high-frequency components. On the other hand, the signal-for-chrominance generation unit 201 performs demosaic processing, noise reduction processing, color correction processing and the like, on image data that has been output from the A/D converter 104, such that an image quality deterioration due to high-frequency components, such as noise and aliasing that is caused by image processing, is reduced as much as possible.

A first tone conversion unit 202 performs a first tone conversion on outputs Ry, Gy, and By of the signal-for-luminance generation unit 200. In addition, a second tone conversion unit 203 performs a second tone conversion on outputs Rc, Gc, and Bc of the signal-for-chrominance generation unit 201.

Here, the first tone conversion unit 202 and the second tone conversion unit 203 may perform tone conversion processing of the same characteristics, or may perform tone conversion processing of different characteristics, but in this embodiment, tone conversion processing of the same characteristics is performed. Expressions 1 to 6 are expressions indicating calculations for generating RGB signals R1c', G1c', and B1c' for chrominance, and RGB signals R1y', G1y', and B1y' for luminance, in the first tone conversion unit 202 and the second tone conversion unit 203.

Here, in the case where the first tone conversion unit 202 and the second tone conversion unit 203 perform tone conversion of the same characteristics, letting input be x, output be y, and a differential coefficient of the conversion characteristics be f1(x), tone conversion processing in this case can be expressed as $y=x*f1(x)$.

$$R1c'=Rc*f1(Rc) \quad (1)$$

$$R1y'=Ry*f1(Ry) \quad (2)$$

$$G1c'=Gc*f1(Gc) \quad (3)$$

$$G1y'=Gy*f1(Gy) \quad (4)$$

$$B1c'=Bc*f1(Bc) \quad (5)$$

$$B1y'=By*f1(By) \quad (6)$$

Outputs of the first tone conversion unit 202 and the second tone conversion unit 203 are input to a signal integration unit 204. The signal integration unit 204 integrates (combines) two types of RGB signals for a luminance signal and a chrominance signal that are respectively output from the first tone conversion unit 202 and the second tone conversion unit 203, and generates one type of RGB signals Rmix, Gmix, and Bmix. Expressions 7 to 9 are expressions indicating calculations that are performed by the signal integration unit 204.

$$Rmix=R1c'+a*(R1y'-R1c')+b*(G1y'-G1c')+c*(B1y'-B1c') \quad (7)$$

$$Gmix=G1c'+a*(R1y'-R1c')+b*(G1y'-G1c')+c*(B1y'-B1c') \quad (8)$$

$$Bmix=B1c'+a*(R1y'-R1c')+b*(G1y'-G1c')+c*(B1y'-B1c') \quad (9)$$

Note that, in Expressions 7 to 9, a, b, and c are any coefficients, and satisfy $a+b+c=1$.

Output of the signal integration unit 204 is input to a third tone conversion unit 205. The third tone conversion unit 205 performs a third tone conversion on the RGB signals Rmix, Gmix, and Bmix that have been output from the signal integration unit 204. In third tone conversion, output signals R2', G2', and B2' are generated using Expressions 10 to 12. Here, letting input be x, output be y, and a differential coefficient of conversion characteristics be f2(x), conversion processing that is performed by the third tone conversion unit 205 can be expressed as $y=x*f2(x)$.

$$R2'=Rmix*f2(Rmix) \quad (10)$$

$$G2'=Gmix*f2(Gmix) \quad (11)$$

$$B2'=Bmix*f2(Bmix) \quad (12)$$

Output of the third tone conversion unit 205 is input to a color-and-luminance separation unit 206. The color-and-luminance separation unit 206 separates a luminance signal Y (luminance signal components) and chrominance signals U and V (chrominance signal components) from the RGB signals that have been output from the third tone conversion unit 205, using Expressions 13 to 15. Note that, in Expression 13 to 15, a1, b1, and c1 are any coefficients, and satisfy $a1+b1+c1=1$.

$$Y=a1*R2'+b1*G2'+c1*B2' \quad (13)$$

$$U=(1-c1)*B2'-a1*R2'-b1*G2' \quad (14)$$

$$V=(1-a1)*R2'-c1*B2'-b1*G2' \quad (15)$$

The luminance signal and chrominance signals that are output from the color-and-luminance separation unit 206 are input from the external output terminal 113 to the HDR monitor via the image memory 106 or the codec unit 110.

Figure 3:
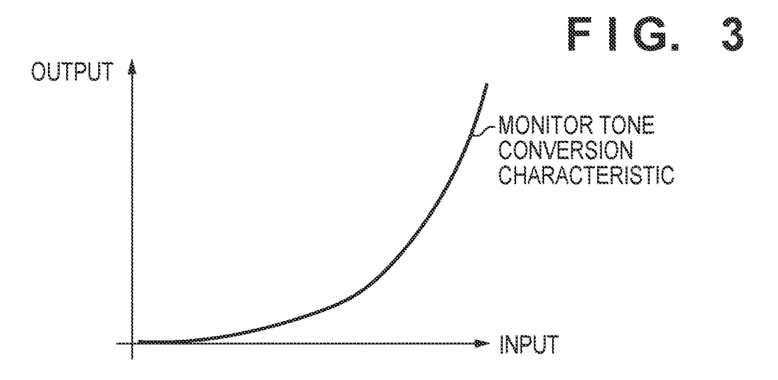
FIG. 3 is a diagram showing a feature of tone conversion characteristics (EOTF characteristics) of an HDR monitor.
Figure 4:
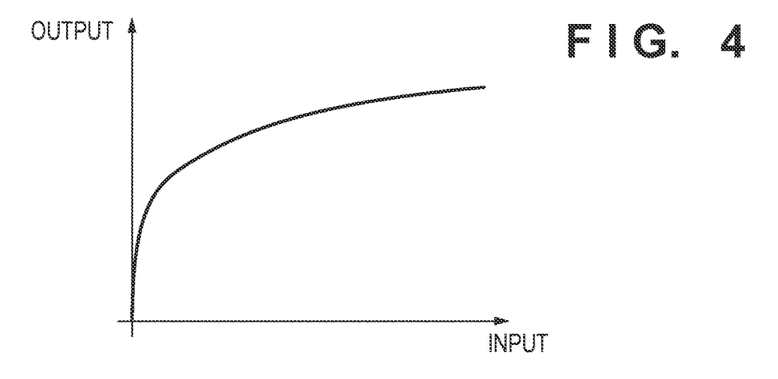
FIG. 4 is a diagram showing a feature of tone conversion characteristics (inverse-EOTF characteristics) of an HDR monitor.
Figure 5:
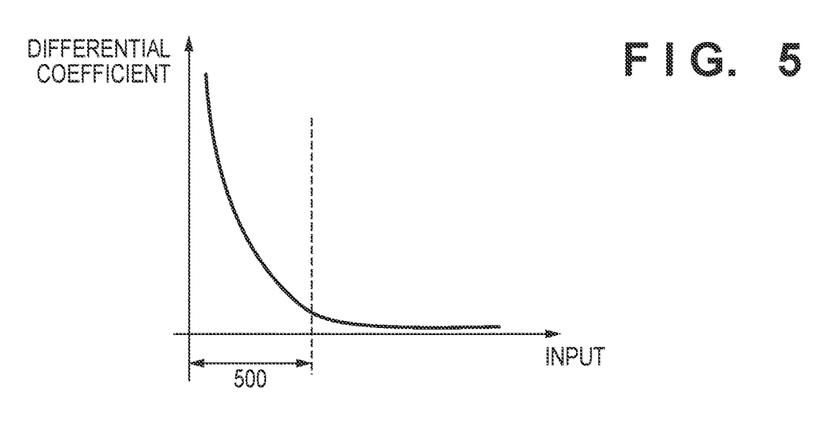
FIG. 5 is a diagram showing a differential coefficient of a curve in FIG. 4.

Next, FIGS. 3, 4, and 5 are diagrams for describing the purposes of processing and actions of the first tone conversion unit 202, the second tone conversion unit 203, and the third tone conversion unit 205.

On a monitor adapted for an HDR (high dynamic range), the correspondence relationship between the quantization level and the display luminance of video signals is prescribed as an EOTF (Electro Optical Transfer Function) in order to reproduce the luminance of a scene with a wide dynamic range (D-range) so as to reduce deterioration as much as possible. In addition, the input/output characteristic of the monitor is as shown in FIG. 3, for example. Therefore, on the camera side, an input image obtained by the image capturing unit 103 is subjected to tone conversion according to the inverse characteristics of the above EOTF (a target curve aimed to be achieved) as shown in FIG. 4, and video signals (output image signals) are output to the monitor. This makes it possible to reproduce the luminance of a scene having a wide dynamic range, as luminance on the monitor. Here, in the case of performing tone conversion according to the input/output characteristics as shown in FIG. 4, a differential coefficient of a tone conversion characteristics is as shown in FIG. 5, and in a region 500 in which the level of an input signal is low, the input signal is amplified with a relatively higher differential coefficient compared with a region in which the input signal level is high.

On the other hand, the image processing unit 105 generates RGB signals for a luminance signal and chrominance signals independently, in order to efficiently generate video signals having a high image quality in consideration of a human visual sense characteristics. Therefore, there are cases where a difference in amplitude level between these two types of RGB signals occurs due to noise and aliasing that is caused by image processing.

Therefore, if the difference in amplitude level between these two types of RGB signals is amplified in tone conversion processing, and then integrated by the signal integration unit 204, the components of the second term onward included in Expressions 7 to 9 increase, and false signals that were not included in input image are generated. In particular, in the case of a highly saturated chromatic subject, regarding a color that takes a value in the vicinity of 0 out of RGB, the components of the second term onward of Expression 7 to 9 increase, and thus color signals that were not included in the original colors appear. If the color components that appeared are emphasized through tone conversion in the monitor, the image quality deteriorates significantly.

Figure 6:
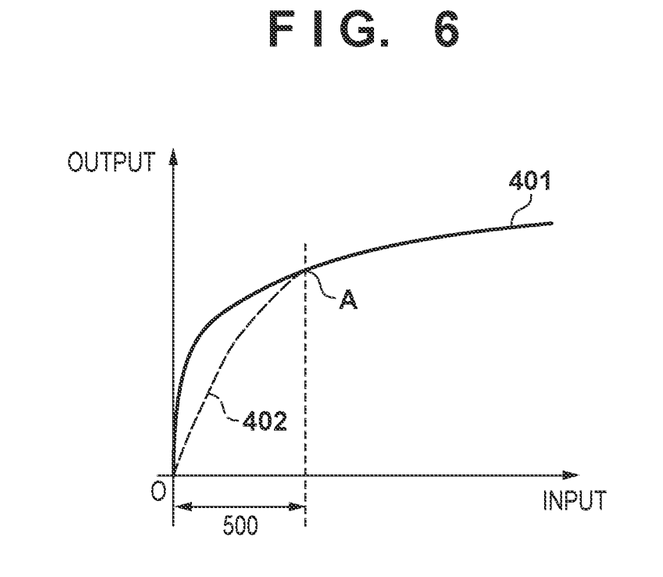
FIG. 6 is a diagram for describing the characteristics of first and second tone conversion units.

In view of this, in this embodiment, the inverse-characteristic of the EOTF adapted for an HDR monitor is applied in two stages, to the first and second tone conversion units 202 and 203 of a first stage, and the third tone conversion unit 205 of a second stage. In the first and second tone conversion units 202 and 203 for the first stage before integration is performed by the signal integration unit 204, it is ensured that the above-described difference in amplitude level between two types of RGB signals is not significantly amplified, and is smaller than or equal to a predetermined level. Specifically, in the region indicated by reference numeral 500 in FIG. 6, tone conversion is performed according to a characteristic (conversion amount) that reduces the rise in a dark portion (low-luminance portion) to be lower than a characteristic that matches an inverse-characteristic 401 of the EOTF adapted for an HDR monitor. The input/output characteristic at this time is a characteristic indicated by reference numeral 402 in FIG. 6, for example. Note that, as described already, the characteristics of tone conversion of the first tone conversion unit 202 and the second tone conversion unit 203 may be common, or may be different within a range in which the difference in amplitude level between the two types of RGB signals after tone conversion is allowable. In addition, the characteristic indicated by reference numeral 402 in FIG. 6 is a curve, but may be a linear characteristic that amplifies an input value using a uniform gain. As an example thereof, a linear characteristic that connects an origin O and a point A in FIG. 6 can be used. Note that, as long as a conversion characteristic according to which the ratios of signal values of RGB signals are maintained before and after tone conversion is used, it is possible to suppress amplification of the difference in amplitude level between the two types of RGB signals, and thus exponential conversion may be performed besides linear conversion.

Figure 7:
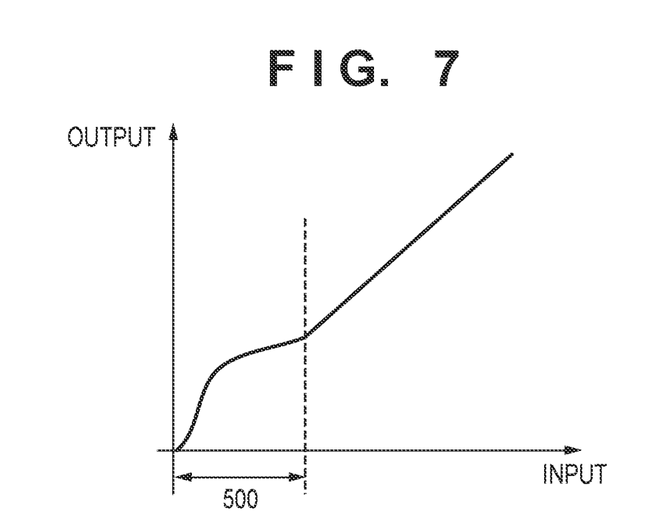
FIG. 7 is a diagram for describing the characteristics of a third tone conversion unit.

On the other hand, after integration was performed by the signal integration unit 204, the third tone conversion unit 205 performs tone conversion according to an input/output characteristic as shown in FIG. 7. The region indicated by reference numeral 500 corresponds to the region indicated by the region indicated by reference numeral 500 in FIG. 6. Regarding the output signal level of the region indicated by reference numeral 500 after tone conversion was performed by the first and second tone conversion units 202 and 203 for the first stage, the amplitude level is lower than that of the inverse-characteristic of the EOTF adapted for the HDR monitor. Therefore, in tone conversion that is performed by the third tone conversion unit 205, and is tone conversion for a second stage, tone conversion is performed so as to amplify the amplitude level that is reduced in tone conversion of a first stage.

Note that this tone conversion having two stages can be rephrased as tone conversion of a relatively low non-linearity that is performed in a first stage before integration is performed by the signal integration unit 204, and tone conversion of a relatively high non-linearity compared with the tone conversion of the first stage that is performed in a second stage after integration is performed by the signal integration unit 204. Those two stages are combined, and tone conversion is performed so as to lastly achieve the inverse-characteristic of an EOTF adapted for an HDR monitor.

As described above, in this embodiment, optimum image processing is performed on an input image that includes linear tone characteristic and has been obtained by the image capturing unit 103, separately for luminance and chrominance. After that, tone conversion of a first stage that is performed by the first and second tone conversion units, and is in a state of being separate for luminance and chrominance is combined with tone conversion of a second stage that is performed by the third tone conversion unit after signals have been integrated, and tone conversion of an inverse-characteristic of an EOTF adapted for an HDR monitor is performed. Accordingly, without emphasizing, through tone conversion, false signals generated due to the difference between signal processing for luminance and signal processing for chrominance, the luminance of a scene obtained by an image capturing unit can be reproduced as luminance on the HDR monitor.

Note that, in this embodiment, RGB is used as a color space for the first and second tone conversion units and the third tone conversion unit to perform tone conversion, but conversion processing may be performed using a color space of another color mixing system/color system such as XYZ or LMS.

Second Embodiment

A digital camera that is a second embodiment of the image processing apparatus of the present invention will be described below. In appearance, this digital camera of the second embodiment is the same as the digital camera of the first embodiment shown in FIG. 1, and only the configuration of an image processing unit 105 is different from the first embodiment. Only this difference from the first embodiment will be described below.

Figure 8:
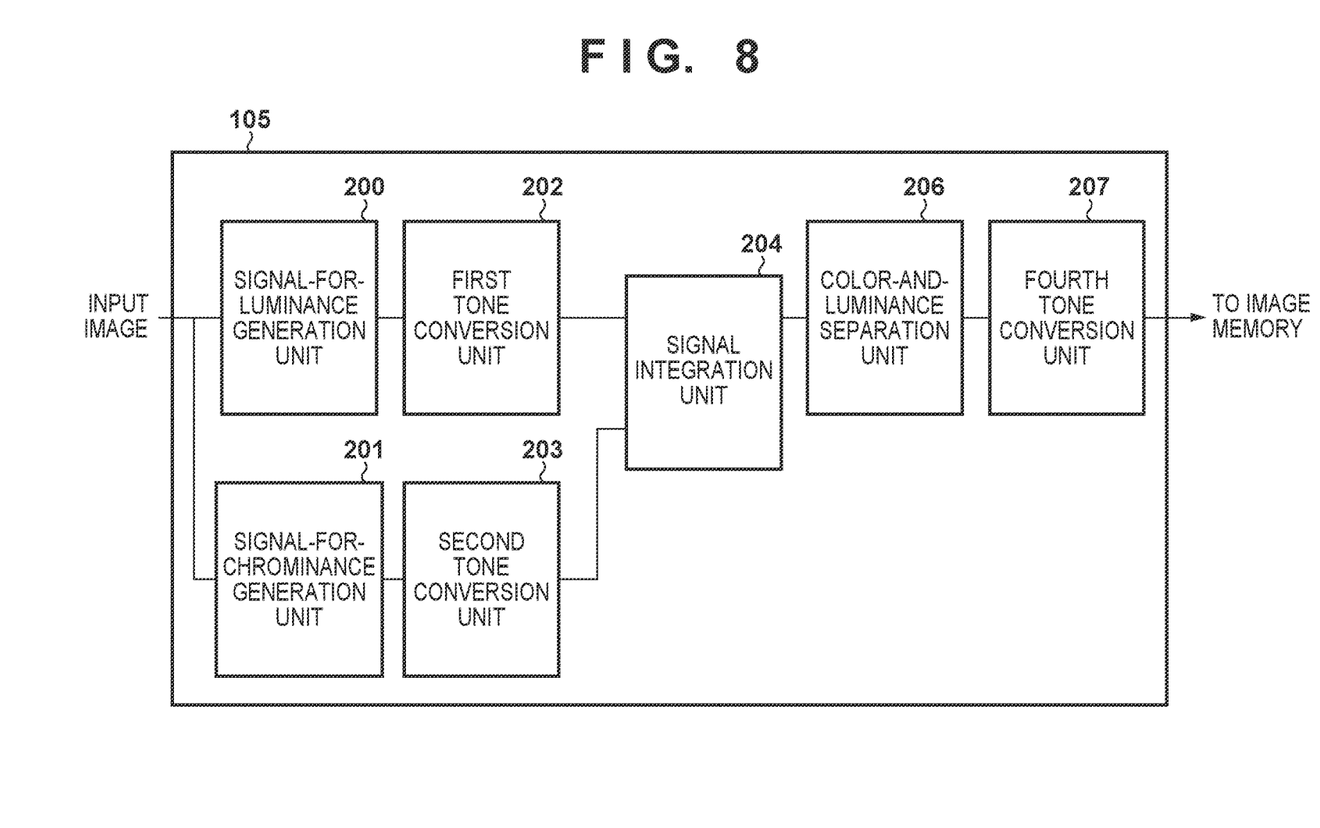
FIG. 8 is a block diagram showing the configuration of an image processing unit in a second embodiment.

FIG. 8 is a diagram showing the configuration of the image processing unit 105 in the second embodiment. Description of constituent elements that perform the same actions as those of the first embodiment is omitted. In FIG.

8, a signal-for-luminance generation unit 200 generates RGB signal components suitable for a luminance signal, from an input image. A signal-for-chrominance generation unit 201 generates RGB signal components suitable for a chrominance signal, from an input image.

A tone conversion unit 202 performs a first tone conversion on outputs Ry, Gy, and By of the signal-for-luminance generation unit 200. Also, a second tone conversion unit 203 performs a second tone conversion on outputs Rc, Gc, and Bc of the signal-for-chrominance generation unit 201.

Outputs of the first tone conversion unit 202 and the second tone conversion unit 203 are input to a signal integration unit 204. The signal integration unit 204 integrates two types of RGB signals for a luminance signal and a chrominance signal that are output from the first tone conversion unit 202 and the second tone conversion unit 203, and generates one type of RGB signal. Output of the signal integration unit 204 is input to a color-and-luminance separation unit 206. The color-and-luminance separation unit 206 separates a luminance signal and a chrominance signal from the RGB signals that are output from the signal integration unit 204.

Output of the color-and-luminance separation unit 206 is input to a fourth tone conversion unit 207. The fourth tone conversion unit 207 performs a fourth tone conversion on a luminance signal and a chrominance signal that are output from the color-and-luminance separation unit 206, using a YUV color space. The luminance signal and the chrominance signal that are output from the fourth tone conversion unit 207 are input from the external output terminal 113 to the HDR monitor via the image memory 106 or the codec unit 110.

In the second embodiment, the inverse-characteristic of the EOTF adapted for an HDR monitor is applied separately in two stages to the first and second tone conversion units 202 and 203 for a first stage and the fourth tone conversion unit 207 for a second stage. In the first and second tone conversion units 202 and 203 for the first stage before integration is performed by the signal integration unit 204, it is ensured that the difference in amplitude level between the two types of RGB signals for luminance and chrominance is not amplified significantly. Specifically, in the region indicated by reference numeral 500 in FIG. 6, tone conversion is performed according to a characteristic that reduces a characteristic rise in a dark portion to be lower than the inverse-characteristic 401 of an EOTF adapted for an HDR monitor. The input/output characteristic at this time is a characteristic indicated by reference numeral 402 in FIG. 6. Note that, as described already, the characteristics of tone conversion in the first tone conversion unit 202 and the second tone conversion unit 203 may be common, or may be different within a range in which the difference in amplitude level between the two types of RGB signals after tone conversion is allowable. In addition, the characteristic indicated by reference numeral 402 in FIG. 6 is a curve, but may be a linear characteristic that amplifies an input value using a uniform gain.

On the other hand, in the fourth tone conversion unit 207 after a luminance signal and a chrominance signal were separated by the color-and-luminance separation unit 206, an input/output characteristic in an RGB space as shown in FIG. 7 is converted into a YUV space, and then tone conversion is performed. The region indicated by reference numeral 500 corresponds to the region indicated by reference numeral 500 in FIG. 6. Regarding the output signal level of the region indicated by reference numeral 500 after tone conversion was performed by the first and second tone conversion units 202 and 203 for a first stage, the amplitude level is lower than that of the inverse-characteristic of an EOTF adapted for an HDR monitor. Therefore, in tone conversion that is performed by the fourth tone conversion unit 207, and is tone conversion of a second stage, tone conversion is performed so as to amplify the amplitude level that is reduced in tone conversion of a first stage, in a YUV space. Specifically, a 3D lookup table in a YUV space is generated based on the tone conversion characteristics in an RGB space in FIG. 7, and regarding each of the luminance signal and the chrominance signal that are output from the color-and-luminance separation unit 206, the amplitude level that is reduced in the tone conversion of a first stage is amplified.

As described above, also in the second embodiment, optimum image processing is performed, separately for luminance and chrominance, on an input image that has been obtained by the image capturing unit 103, and has a linear tone characteristic. After that, tone conversion of a first stage that is performed by the first and second tone conversion units, and is in a state of being separate for luminance and chrominance is combined with tone conversion of a second stage that is performed by the fourth tone conversion unit after signals are integrated, and tone conversion of an inverse-characteristic of an EOTF adapted for an HDR monitor is performed. Accordingly, without emphasizing, through tone conversion, false signals generated due to the difference between signal processing for luminance and signal processing for chrominance, the luminance of a scene obtained by an image capturing unit can be reproduced as luminance on the HDR monitor.

Note that, in this embodiment, RGB is used as a color space for the first and second tone conversion units to perform tone conversion, but conversion processing may be performed using a color space of another color mixing system/color system such as XYZ or LMS. Also, YUV is used as a color space for the fourth tone conversion unit to perform tone conversion, but conversion processing may be performed using another color space of a color-luminance separation format such as ICtCp.

Third Embodiment

A digital camera that is a third embodiment of the image processing apparatus of the present invention will be described below. In appearance, this digital camera of the third embodiment is the same as the digital camera of the first embodiment shown in FIG. 1, and only the configuration of an image processing unit 105 is different from the first embodiment. Only this difference from the first embodiment will be described below.

Figure 9:
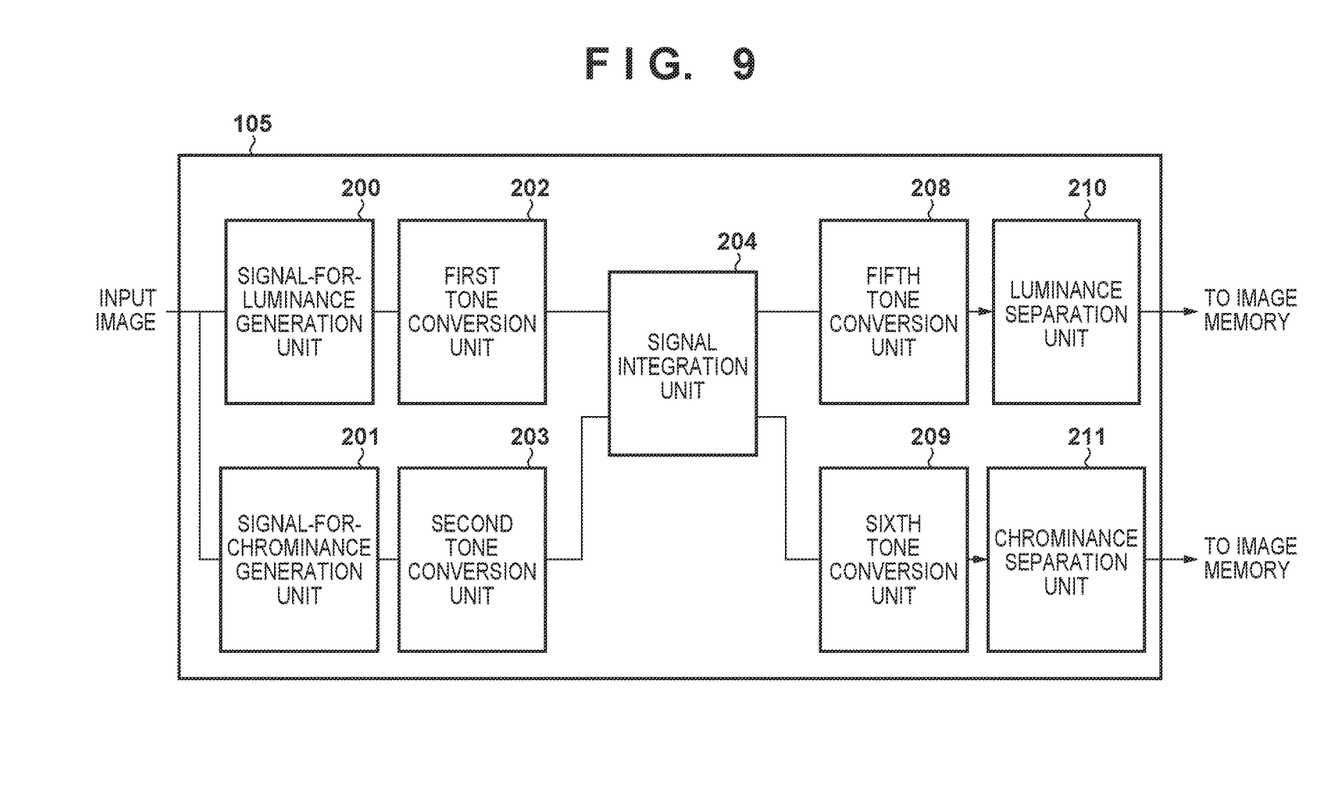
FIG. 9 is a block diagram showing the configuration of an image processing unit in a third embodiment.

FIG. 9 is a diagram showing the configuration of the image processing unit 105 in the third embodiment. Description of constituent elements that perform the same actions as those of the first embodiment is omitted. In FIG. 9, a signal-for-luminance generation unit 200 generates RGB signal components suitable for luminance signals, from an input image. A signal-for-chrominance generation unit 201 generates RGB signal components suitable for chrominance signals, from an input image.

A first tone conversion unit 202 performs a first tone conversion on outputs Ry, Gy, and By of the signal-for-luminance generation unit 200. In addition, a second tone conversion unit 203 performs a second tone conversion on outputs Rc, Gc, and Bc of the signal-for-chrominance generation unit 201.

Outputs of the first tone conversion unit 202 and the second tone conversion unit 203 are input to a signal integration unit 204. The signal integration unit 204 integrates two types of RGB signals for a luminance signal and a chrominance signal that have been output from the first tone conversion unit 202 and the second tone conversion unit 203, and generates one type of RGB signals.

Output of the integration unit 204 is input to a fifth tone conversion unit 208 and a sixth tone conversion unit 209. The fifth tone conversion unit 208 performs a fifth tone conversion for luminance output on the RGB signals that have been output from the signal integration unit 204. The sixth tone conversion unit 209 performs a sixth tone conversion for chrominance output on the RGB signals that have been output from the signal integration unit 204.

Output of the fifth tone conversion unit 208 is input to a luminance separation unit 210. The luminance separation unit 210 separates luminance signals from the RGB signals that have been output from the fifth tone conversion unit 208. Output of the sixth tone conversion unit 209 is input to a chrominance separation unit 211. The chrominance separation unit 211 separates chrominance signals from the RGB signals that have been output from the sixth tone conversion unit 209.

The luminance signals and chrominance signals that are output from the luminance separation unit 210 and the chrominance separation unit 211 are input from an external output terminal 113 to an HDR monitor via an image memory 106 or a codec unit 110.

In the third embodiment, the inverse-characteristic of an EOTF adapted for an HDR monitor is applied in two stages to the first and second tone conversion units 202 and 203 for a first stage and the fifth and sixth tone conversion units 208 and 209 for a second stage. In the first and second tone conversion units 202 and 203 for a first stage before integration is performed by the signal integration unit 204, it is ensured that the difference in amplitude level between two types of RGB signals for luminance and chrominance is not amplified significantly. Specifically, in a region indicated by reference numeral 500 in FIG. 6, tone conversion is performed according to a characteristic that reduces the rise in a dark portion to be lower than an inverse-characteristic 401 of an EOTF adapted for an HDR monitor. The input/output characteristic at this time is a characteristic as indicated by reference numeral 402 in FIG. 6, for example. Note that, as described already, the characteristics of tone conversion in the first tone conversion unit 202 and the second tone conversion unit 203 may be common, or may be different within a range in which the difference in amplitude level between the two types of RGB signals after tone conversion is allowable. In addition, the characteristic indicated by reference numeral 402 in FIG. 6 is a curve, but may be a linear characteristic that amplifies an input value using a uniform gain.

Figure 10:
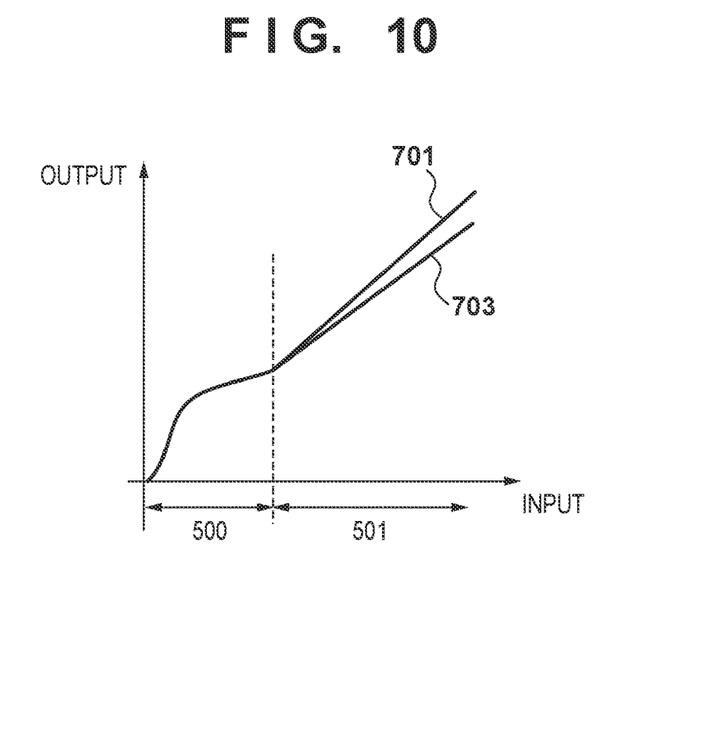
FIG. 10 is a diagram for describing the characteristics of fifth and sixth tone conversion units.

On the other hand, after integration was performed by the signal integration unit 204, the fifth tone conversion unit 208 performs tone conversion according to an input/output characteristic as indicated by reference numeral 701 in FIG. 10. A region indicated by reference numeral 500 corresponds to the region indicated by reference numeral 500 in FIG. 6. Regarding the output signal level of the region indicated by reference numeral 500 after tone conversion was performed by the first and second tone conversion units 202 and 203 for a first stage, the amplitude level is lower than that of the inverse-characteristic of an EOTF adapted for an HDR monitor. Therefore, in tone conversion that is performed by the fifth tone conversion unit 208, and is tone conversion of a second stage, tone conversion is performed so as to amplify the amplitude level that is reduced in tone conversion of a first stage.

Figure 11:
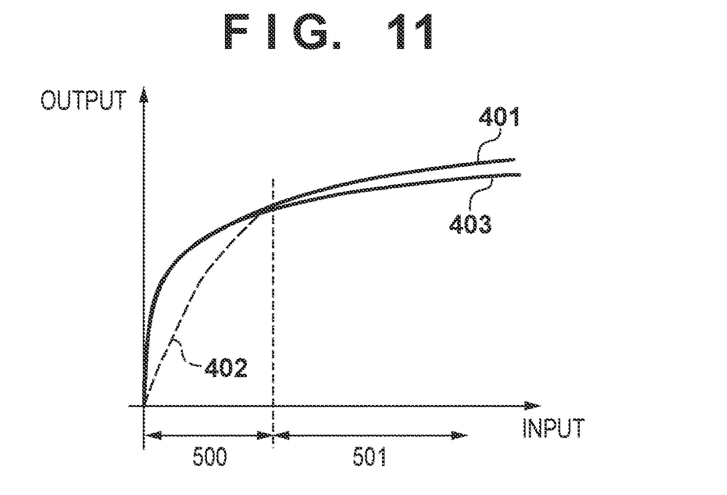
FIG. 11 is a diagram showing tone conversion characteristics in an image processing unit in the third embodiment.

In addition, after integration was performed by the signal integration unit 204, the sixth tone conversion unit 209 performs tone conversion according to an input/output characteristic as indicated by reference numeral 703 in FIG. 10. A region indicated by reference numeral 500 corresponds to the region indicated by reference numeral 500 in FIG. 6. The amplitude level of the output signal level of the region indicated by reference numeral 500 after tone conversion was performed by the first tone conversion unit 202 and the second tone conversion unit 203 for a first stage is lower than that of the inverse-characteristic of an EOTF adapted for an HDR monitor. Therefore, in tone conversion that is performed by the sixth tone conversion unit 209, and is tone conversion of a second stage, in the region indicated by reference numeral 500, tone conversion is performed so as to amplify the amplitude level that is reduced in the tone conversion of a first stage. In addition, in a region indicated by reference numeral 501 in which the amplitude level of an input signal is relatively high, tone conversion is performed according to tone conversion characteristics different from those of the fifth tone conversion unit 208. For example, tone conversion of the fifth tone conversion unit 208 is performed according to a characteristic indicated by reference numeral 701, and tone conversion of the sixth tone conversion unit 209 is performed according to a characteristic indicated by reference numeral 703. In this case, the tone regeneration characteristics of RGB signals for luminance and RGB signals for chrominance that are output lastly are characteristics indicated by reference numerals 401 and 403 in FIG. 11, respectively. Therefore, fine adjustment of luminance on the highlight side and gradation of saturation is made possible. Here, adjustment of the characteristics of tone conversion of the fifth tone conversion unit 208 and the sixth tone conversion unit 209 is to adjust the difference between RGB signals for luminance and chrominance that have been integrated by the signal integration unit 204, in particular, noise components and the amplitude level of signals that are included in a larger number in one of the above two types of RGB signals to an extent to which they are not amplified too much.

As described above, also in the third embodiment, optimum image processing for luminance and optimum image processing for chrominance are separately performed on an input image that has been obtained by the image capturing unit 103, and has a linear tone characteristic. After that, tone conversion of a first stage that is performed by the first and second tone conversion units, and is in a state of being separate for luminance and chrominance is combined with tone conversion of a second stage that is performed by the fifth and sixth tone conversion units after signals have been integrated, and tone conversion according to an inverse-characteristic of an EOTF adapted for an HDR monitor is performed. Accordingly, without emphasizing, through tone conversion, false signals generated due to the difference between signal processing for luminance and signal processing for chrominance, the luminance of a scene obtained by the image capturing unit can be reproduced as luminance on the HDR monitor.

Furthermore, by changing the tone conversion characteristics in the fifth tone conversion and sixth tone conversion that are performed after RGB signals for luminance and chrominance are integrated, the color tone reproducibility of luminance signal and color signal that are lastly output can be adjusted in accordance with the user's preference and a scene.

Note that, in this embodiment, RGB is used as a color space for the first, second, fifth, and sixth tone conversion units to perform tone conversion, but conversion processing may be performed using a color space of another color mixing system/color system such as XYZ or LMS.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-119883, filed Jun. 19, 2017 which is hereby incorporated by reference herein in its entirety.

What is claimed is:

1. An image processing apparatus that performs tone conversion on an input image signal such that a curve indicating a relationship between a signal level of an input image signal and a signal level of an output image signal matches a target curve aimed to be achieved, the image processing apparatus comprising:
   at least one processor and/or circuit configured to function as following units;
     a first generation unit configured to generate a color signal component for a luminance signal from an input image signal;
     a second generation unit configured to generate a color signal component for a chrominance signal from an input image signal;
     a first tone conversion unit configured to perform a first tone conversion on the color signal component for a luminance signal;
     a second tone conversion unit configured to perform a second tone conversion on the color signal component for a chrominance signal;
     a third generation unit configured to generate a color signal component used in common for a luminance signal and a chrominance signal by combining an output of the first tone conversion unit and an output of the second tone conversion unit; and
     a third tone conversion unit configured to perform a third tone conversion on a signal after being processed by the third generation unit,
   wherein the first and second tone conversion units perform tone conversion using a conversion amount smaller than a conversion amount that is set such that a curve indicating the relationship between the signal level of an input image signal and the signal level of an output image signal matches the target curve, and the third tone conversion unit performs tone conversion using a conversion amount corresponding to a difference from the target curve that remained after the first and second tone conversion units performed tone conversion.

2. The image processing apparatus according to claim 1, wherein the first tone conversion unit and the second tone conversion unit perform tone conversion such that a difference in amplitude between a color signal component that is output from the first tone conversion unit and a color signal component that is output from the second tone conversion unit is smaller than or equal to a predetermined level.

3. The image processing apparatus according to claim 1, wherein a degree of amplification of an amplitude that is performed in a low-luminance portion of an input signal by the third tone conversion unit is higher than those by the first tone conversion unit and the second tone conversion unit.

4. The image processing apparatus according to claim 1, wherein the first tone conversion unit and the second tone conversion unit perform tone conversion of the same characteristic.

5. The image processing apparatus according to claim 1, wherein tone conversion that is performed by the first and second tone conversion units includes tone conversion in which a curve indicating a relationship between a signal level of an input signal and a signal level of an output signal is a straight line.

6. The image processing apparatus according to claim 1, wherein the target curve is a curve representing an inverse-characteristic of an EOTF (Electro Optical Transfer Function) of a monitor adapted for a high dynamic range.

7. The image processing apparatus according to claim 1, wherein the color signal component is constituted by RGB signal components.

8. The image processing apparatus according to claim 1, wherein the at least one processor and/or circuit is configured to further function as:
   a separation unit configured to separate a color signal component that is output from the third tone conversion unit into a luminance signal component and a chrominance signal component.

9. The image processing apparatus according to claim 1, wherein the at least one processor and/or circuit is configured to further function as:
   a separation unit configured to separate the common color signal component that is output from the third generation unit, into a luminance signal components and a chrominance signal components.

10. The image processing apparatus according to claim 9, wherein the third tone conversion unit includes a fourth tone conversion unit that converts an input/output characteristic in an RGB space into a YUV space, and then performs tone conversion.

11. The image processing apparatus according to claim 1, wherein the third tone conversion unit includes a fifth tone conversion unit that performs tone conversion for luminance output on a color signal component that is output from the third generation unit, and a sixth tone conversion unit that performs tone conversion for chrominance output on a color signal component that is output from the third generation unit.

12. The image processing apparatus according to claim 11,
wherein the fifth tone conversion unit and the sixth tone conversion unit perform tone conversion of different characteristics.

13. An image processing apparatus that performs tone conversion on an input image signal, comprising:
at least one processor and/or circuit configured to function as following units:
a first generation unit configured to generate a color signal component for a luminance signal from an input image signal;
a second generation unit configured to generate a color signal component for a chrominance signal from an input image signal;
a first tone conversion unit configured to perform a first tone conversion on the color signal component for a luminance signal;
a second tone conversion unit configured to perform a second tone conversion on the color signal component for a chrominance signal;
a third generation unit configured to generate a color signal component used in common for a luminance signal and a chrominance signal by combining an output of the first tone conversion unit and an output of the second tone conversion unit; and
a third tone conversion unit configured to perform a third tone conversion on a signal after being processed by the third generation unit,
wherein the first and second tone conversion units perform tone conversion of a relatively low non-linearity, and the third tone conversion unit performs tone conversion of a relatively high non-linearity compared to the first and second tone conversion units.

14. The image processing apparatus according to claim 13,
wherein the image processing apparatus is an image processing apparatus that performs tone conversion on an input image signal such that a curve indicating a relationship between a signal level of an input image signal and a signal level of an output image signal matches a target curve aimed to be achieved,
the first and second tone conversion units perform tone conversion using a conversion amount smaller than a conversion amount that is set such that a curve indicating the relationship between the signal level of an input image signal and the signal level of an output image signal matches the target curve, and the third tone conversion unit performs tone conversion using a conversion amount corresponding to a difference from the target curve that remained after the first and second tone conversion units performed tone conversion.

15. An image processing method for performing tone conversion on an input image signal such that a curve indicating a relationship between a signal level of an input image signal and a signal level of an output image signal matches a target curve aimed to be achieved, the method comprising:
executing a first generation for generating a color signal component for a luminance signal from an input image signal;
executing a second generation for generating a color signal component for a chrominance signal from an input image signal;
performing a first tone conversion on the color signal component for a luminance signal;
performing a second tone conversion on the color signal component for a chrominance signal;
executing a third generation for generating a color signal component used in common for a luminance signal and a chrominance signal by combining an output of the first tone conversion and an output of the second tone conversion; and
performing a third tone conversion on a signal after being processed in the third generation,
wherein, in the first and second tone conversions, tone conversion is performed using a conversion amount smaller than a conversion amount that is set such that a curve indicating the relationship between the signal level of an input image signal and the signal level of an output image signal matches the target curve, and in the third tone conversion, tone conversion is performed using a conversion amount corresponding to a difference from the target curve that remained after the first and second tone conversions were performed.

16. An image processing method for performing tone conversion on an input image signal, the method comprising:
executing a first generation for generating a color signal component for a luminance signal from an input image signal;
executing a second generation for generating a color signal component for a chrominance signal from an input image signal;
performing a first tone conversion on the color signal component for a luminance signal;
performing a second tone conversion on the color signal component for a chrominance signal;
executing a third generation for generating a color signal component used in common for a luminance signal and a chrominance signal by combining an output of the first tone conversion and an output of the second tone conversion; and
performing a third tone conversion on a signal after being processed in the third generation,
wherein, in the first and second tone conversion, tone conversion of a relatively low non-linearity is performed, and in the third tone conversion, tone conversion of a relatively high non-linearity compared to those in the first and second tone conversion is performed.

17. A non-transitory computer-readable storage medium that stores a program for causing a computer to execute steps of an image processing method for performing tone conversion on an input image signal such that a curve indicating a relationship between a signal level of an input image signal and a signal level of an output image signal matches a target curve aimed to be achieved, the method comprising: executing a first generation for generating a color signal component for a luminance signal from an input image signal; executing a second generation for generating a color signal component for a chrominance signal from an input image signal; performing a first tone conversion on the color signal component for a luminance signal; performing a second tone conversion on the color signal component for a chrominance signal; executing a third generation for generating a color signal component used in common for a luminance signal and a chrominance signal by combining an output of the first tone conversion and an output of the second tone conversion; and performing a third tone conversion on a signal after being processed in the third generation, wherein, in the first and second tone conversions, tone conversion is performed using a conversion amount smaller than a conversion amount that is set such that a curve indicating the relationship between the signal level of an input image signal and the signal level of an output image signal matches the target curve, and in the third tone conversion, tone conversion is performed using a conversion amount corresponding to a difference from the target curve that remained after the first and second tone conversions were performed.

18. A non-transitory computer-readable storage medium that stores a program for causing a computer to execute steps of an image processing method for performing tone conversion on an input image signal, the method comprising: executing a first generation for generating a color signal component for a luminance signal from an input image signal; executing a second generation for generating a color signal component for a chrominance signal from an input image signal; performing a first tone conversion on the color signal component for a luminance signal; performing a second tone conversion on the color signal component for a chrominance signal; executing a third generation for generating a color signal component used in common for a luminance signal and a chrominance signal by combining an output of the first tone conversion and an output of the second tone conversion; and performing a third tone conversion on a signal after being processed in the third generation, wherein, in the first and second tone conversions, tone conversion of a relatively low non-linearity is performed, and in the third tone conversion, tone conversion of a relatively high non-linearity compared to those in the first and second tone conversion is performed.

* * * * *